United States Patent
Stojkovic et al.

(10) Patent No.: US 7,547,063 B2
(45) Date of Patent: Jun. 16, 2009

(54) UNITIZED VEHICLE FRAME SUBASSEMBLY AND METHOD OF ASSEMBLING A SIDE FRAME FOR A VEHICLE

(75) Inventors: Dragan Stojkovic, Southgate, MI (US); Lawrence J. Dupuis, Grosse Ile, MI (US); Randy Linn, Livonia, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 393 days.

(21) Appl. No.: 11/559,644

(22) Filed: Nov. 14, 2006

(65) Prior Publication Data

US 2008/0111398 A1 May 15, 2008

(51) Int. Cl.
*B60N 99/00* (2006.01)
(52) U.S. Cl. .............................. 296/203.3; 296/193.05
(58) Field of Classification Search ........... 296/193.04, 296/193.05, 193.06, 193.09, 203.03, 203.02
See application file for complete search history.

(56) References Cited

U.S. PATENT DOCUMENTS

| | | | |
|---|---|---|---|
| 6,099,039 A | 8/2000 | Hine | |
| 6,302,478 B1 * | 10/2001 | Jaekel et al. | 296/205 |
| 6,533,348 B1 * | 3/2003 | Jaekel et al. | 296/205 |
| 6,539,604 B2 | 4/2003 | Patelczyk | |
| 6,561,563 B2 | 5/2003 | Okana et al. | |
| 6,623,067 B2 * | 9/2003 | Gabbianelli et al. | 296/205 |
| 6,648,403 B2 | 11/2003 | Hanyu | |
| 2001/0050497 A1 * | 12/2001 | Jaekel et al. | 296/205 |
| 2005/0071975 A1 | 4/2005 | Ni et al. | |
| 2005/0189790 A1 | 9/2005 | Chernoff et al. | |
| 2006/0059807 A1 * | 3/2006 | Zimmerman et al. | 52/239 |

* cited by examiner

*Primary Examiner*—Lori L Lyjak
(74) *Attorney, Agent, or Firm*—Frederick Owens; Brooks Kushman P.C.

(57) ABSTRACT

A frame subassembly for a vehicle is provided that includes a one-piece hydro-formed upper side beam and may also include a one-piece hydro-formed lower side beam. The side beams extend from the front or grill area of the vehicle to the rear portion of the vehicle. The side beams are interconnected by A, B and C pillars. The beams are welded to each other through access openings in the beams and in and the pillars. The pillars are attached to the beams by welding through access holes.

16 Claims, 1 Drawing Sheet

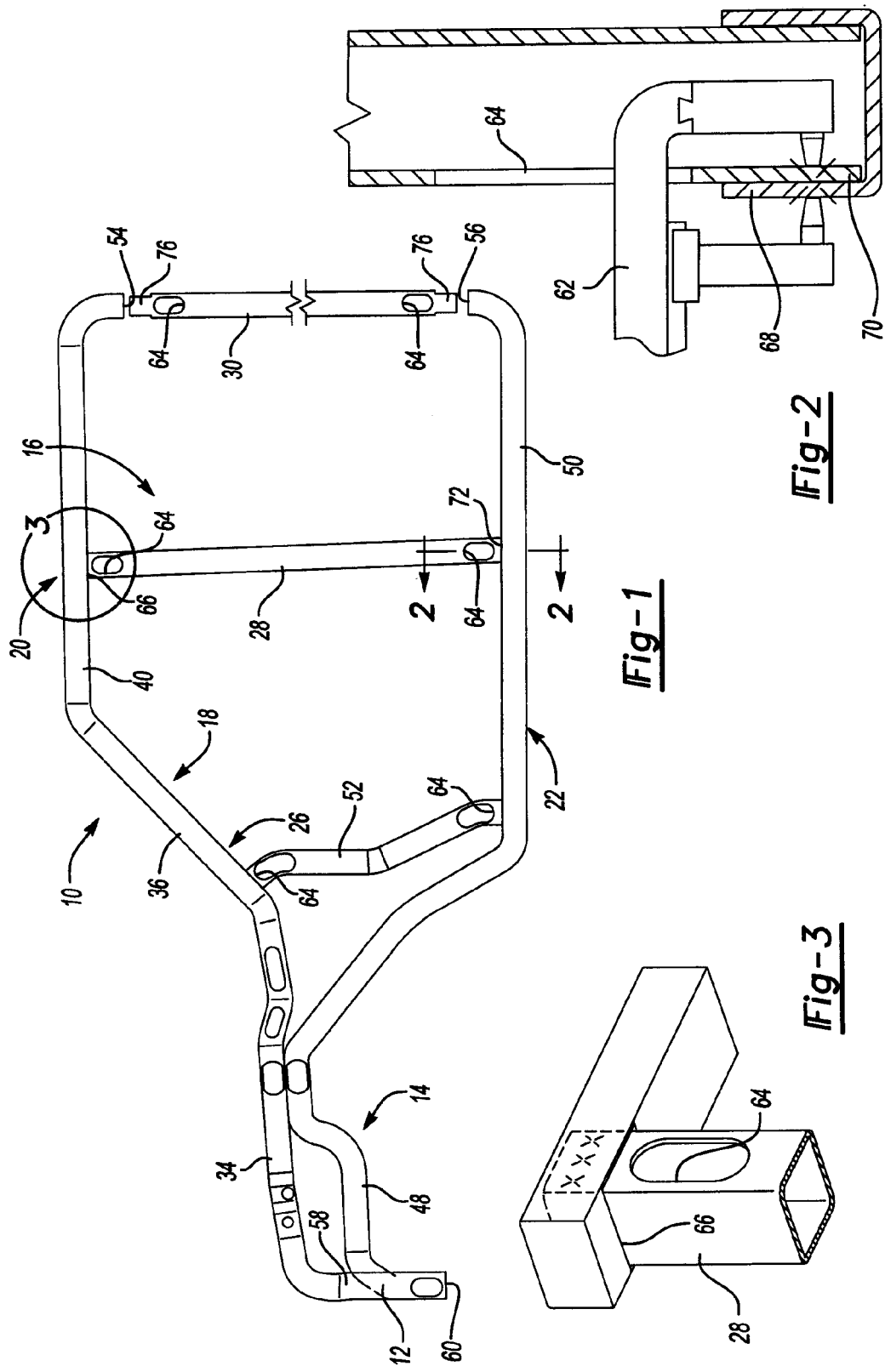

UNITIZED VEHICLE FRAME SUBASSEMBLY AND METHOD OF ASSEMBLING A SIDE FRAME FOR A VEHICLE

BACKGROUND OF THE INVENTION

1. Field of the Invention

The present invention relates to a vehicle side frame subassembly wherein an upper hydro-formed rail and a lower hydro-formed rail are joined together by a plurality of pillars to form the side frame subassembly of the vehicle.

2. Background Art

Vehicle bodies require a frame to which body outer panels and other structural members are secured generally by welding. Vehicle frames are generally formed by welding together multiple sheet metal stampings that may be initially assembled as subassemblies. A large number of parts generally must be assembled together to form a side frame of a vehicle. Each part may vary to a limited extent in shape and dimensions as permitted by manufacturing tolerances. The problem with assembling a large number of parts together is that the dimensions of the final assembly may vary due to tolerance stack up.

Another problem with frame subassemblies manufactured from a large number of parts is that the cost of the assembly increases with part count due to the need to assemble and weld the multiple parts together. Also, substantial fixtures are required to hold the components of the frame together during assembly and welding operations. Large complex fixtures for manufacturing multi-part frame subassemblies add fixed costs to vehicle manufacturing facilities that are amortized over a number of vehicles manufactured with the tooling.

These and other problems and challenges are addressed by applicants' invention as summarized below.

SUMMARY OF THE INVENTION

A frame subassembly is provided for a vehicle that has a front end that partially defines an engine compartment and a passenger compartment. The passenger compartment includes a windshield that is located rearward of the front end. The frame subassembly comprises a one-piece hydro-formed beam having an upper fender reinforcement portion disposed at the front end, an upper A-pillar portion disposed adjacent the windshield, and a roof rail portion that spans the length of the passenger compartment. The front structural components are attached to the upper fender reinforcement portion and the windshield is attached to the upper A-pillar portion. The roof of the vehicle is attached to the roof rail portion.

A frame subassembly is provided for a vehicle. The vehicle has a front end that partially defines an engine compartment and a passenger compartment including a windshield that is located rearward of the front end. The frame subassembly comprises a one-piece hydro-formed upper side beam having a first fender reinforcement portion disposed at the front end, an upper A-pillar portion disposed adjacent the windshield and a roof rail portion that spans the length of the passenger compartment. The subassembly further includes a one-piece hydro-formed lower side beam having a second fender reinforcement portion disposed at the front end, and a rocker beam portion rearward of the second fender reinforcement portion. A lower A-pillar is attached to the upper side beam adjacent the lower edge of the windshield and to the lower side beam adjacent a forward end of the rocker beam portion. A B-pillar is attached to the upper side beam at an intermediate location on the roof rail portion and to the lower side beam at an intermediate location. A C-pillar is attached to a downwardly oriented opening at an upper rear terminal end of the upper side beam and an upwardly oriented opening at a lower rear terminal end of the lower side beam.

According to other aspects relating to the frame subassembly, the vehicle has an A-pillar that is partially formed by the upper A-pillar portion of the beam and a lower A-pillar beam that is welded to the upper A-pillar portion. A B-pillar is secured at an intermediate point on the roof rail portion between the front door and the rear door of the vehicle. A C-pillar is secured to the a rear end of the roof rail portion. The C-pillar may have a reduced cross-section portion at an upper end. The beam may have an open end in which the upper end of the C-pillar is inserted. The open end of the beam is oriented to face downwardly.

The B-pillar may have an access opening adjacent an upper end and a beam may have an intermediate opening in the lower face of the beam. The B-pillar is assembled to the beam with the upper end of the B-pillar being inserted into the intermediate opening. The B-pillar has a welding flange disposed between the access opening and an upper end of the B-pillar that is welded to an inner surface of the roof rail portion of the beam.

According to other aspects, a front end of the first fender reinforcement portion and a front end of the second fender reinforcement portion are welded together. Further, the first fender reinforcement portion and the second fender reinforcement portion may be welded together at an intermediate location beside the engine compartment between the windshield and the front ends of the fender reinforcement portions.

The B-pillar may have an access opening adjacent an upper end and the upper side beam may have an intermediate opening in a lower face. The B-pillar is assembled to the upper side beam with an upper end of the B-pillar being inserted into the intermediate opening. A B-pillar may have a welding flange disposed between the access opening and the upper end of the B-pillar is that is welded to an inner surface of the roof rail portion of the upper side beam. The B-pillar may have a second access opening adjacent a lower end and the lower side beam may have a mid-rocker opening in an upper face of the lower side beam. The B-pillar may be assembled to the lower side beam with a lower end of the B-pillar being inserted into the mid-rocker opening. The B-pillar may have a second welding flange disposed between the second access opening and the lower end of the B-pillar that is welded to an inner surface of the rocker portion of the beam.

According to other aspects relating to the C-pillar, the C-pillar may have a reduced cross-section portion at an upper end of the C-pillar. The upper side beam may have an open end in which the C-pillar is inserted wherein the open end of the beam is oriented to face downwardly. The C-pillar may also have a reduced cross-section portion at a lower end of the C-pillar wherein the lower side beam may have an open end in which the C-pillar is inserted. The open end of the lower side beam is oriented to face upwardly.

According to another aspect, a method of assembling a side frame for a vehicle having a front grill and a back end is provided. The method comprises hydro-forming an upper side rail that has a front portion to which the front grill is attached and a rear portion to which the back end structure of the vehicle is attached. A lower side rail is hydro-formed to have a front portion to which the front grill is attached and a rear portion to which the back end structure of the vehicle is attached. The front portions of the upper and lower side rails are welded together and the A, B and C-pillars are assembled to the upper and lower side rails. The A, B and C-pillars are welded to the upper and lower side rails.

According to other aspects of the method, the step of hydro-forming the upper side rail may further comprise forming a fender reinforcement portion that is disposed adjacent an engine compartment of the vehicle and forming a roof rail portion that is disposed adjacent a passenger compartment of the vehicle. The step of hydro-forming a lower side rail may further comprise forming a fender reinforcement portion that is disposed adjacent an engine compartment of the vehicle. A rocker portion is formed that is disposed adjacent a passenger compartment portion of the vehicle.

According to still further aspects of the method, the step of hydro-forming the upper and lower side rails may further comprise forming access holes in the side rails. At least one access hole is formed in each of the side rails to facilitate welding the side rails to each other. At least one A-pillar access hole is formed in the side rails for receiving the A-pillar and at least one B-pillar access hole is formed in the side rails for receiving the B-pillar.

The step of hydro-forming the upper and lower side rails may further comprise forming a rear end of the upper side rail to extend in an downward direction and forming a rear end of the lower side rail to extend in an upward direction. The upper and lower ends of the C-pillar are necked down to be assembled inside the rear ends of the upper and lower side rails.

These and other aspects will be better understood in view of the attached drawings and the following detailed description of the illustrated embodiment.

BRIEF DESCRIPTION OF THE DRAWINGS

FIG. 1 is a side elevation view of a frame subassembly for a vehicle;

FIG. 2 is a cross-sectional view taken along the line 2-2 in FIG. 1; and

FIG. 3 is a fragmentary perspective view showing a pillar and hydro-formed beam positioned to be welded together through the access hole of the beam.

DETAILED DESCRIPTION OF THE PREFERRED EMBODIMENT(S)

Referring to FIG. 1, the frame subassembly 10 for a vehicle is shown separate and apart from the vehicle. The frame subassembly 10 includes a front end 12 that corresponds to the location where the grill of the vehicle is attached. An engine compartment area 14 is provided behind the front end 12. It should be understood that references to the front or rear of the vehicle and the like should be understood as being references to the vehicle direction. A passenger compartment area 16 is provided that includes a windshield area 18. The passenger compartment area 16 is behind the engine compartment area 14 with the windshield area 18 comprising the front part of the passenger compartment area 16.

The frame subassembly includes an upper side beam 20 and a lower side beam 22. The upper side beam 20 extends from the front end 12 and along the length of the passenger compartment area 16. The lower side beam 22 extends from the front end 12 across the bottom of the passenger compartment area 16 to the back portion of the passenger compartment area 16. The upper and lower side beams 20, 22 are one-piece continuous beams that are formed in the hydro-forming process. The hydro-forming process produces structural parts, such as the beams, to close dimensional tolerances that are not impacted by tolerance stack up that would pertain to beams made from individual stampings that are welded together.

An A-pillar is generally indicated by reference numeral 26. The A-pillar is the forward most pillar supporting the roof of the vehicle and is generally aligned with the windshield area 18. A B-pillar 28 is provided at an intermediate, or central, location of the passenger compartment area 16. A C-pillar 30 is provided to support the roof of the vehicle in the rear of the passenger compartment area 16. It should be understood that some vehicles have a D-pillar that would be the last pillar supporting the roof with a C-pillar being an intermediate pillar similar to B-pillar 28.

The upper side beam has a fender reinforcement portion 34 that is located adjacent to the engine compartment area 14. An upper A-pillar portion 36 is provided immediately behind and adjacent the fender reinforcement portion 34. The upper A-pillar portion 36 is located adjacent to the windshield area 18. A roof rail portion 40 of the upper side beam 20 is provided at the side of the passenger compartment area 16 adjacent the top or roof portion of the vehicle. The upper side beam 20 extends from the front end 12 across the fender reinforcement portion 34 that is followed by the upper A-pillar portion 36. The upper A-pillar portion 36 is adjacent the roof rail portion 40 and extends to the rear portion of the passenger compartment area 16.

The lower side beam 22 includes a fender reinforcement portion 48 that is immediately behind the front end 12. The fender reinforcement portion 48 is adjacent to the engine compartment area 14. A rocker beam portion 50 of the lower side beam 22 is provided rearward of the fender reinforcement portion 48. The upper A-pillar portion 36 of the upper side beam is joined by a lower A-pillar 52 that is formed as a separate component and attached between the upper side beam 20 and lower side beam 22. The lower A-pillar 52 and upper A-pillar portion 36 of the upper side beam 20 together form the A-pillar of the vehicle.

An opening 54 is formed at an upper rear terminal end of the upper side beam 20. An opening 56 is formed at a lower rear terminal end of the lower side beam 22. The C-pillar 30 is received in the openings 54, 56.

At the front of the vehicle a front end 58 of the fender reinforcement portion 34 is welded to a front end 60 of the second fender reinforcement portion 48. The front ends 58, 60 are welded together.

Referring to FIG. 2, a welding gun 62 is partially illustrated that is inserted into an access opening 64. The access opening 64 illustrated in FIG. 2 is the access opening 64 formed at the lower end of the B-pillar 28. Other access openings 64 are provided to facilitate welding the upper and lower side beams 20, 22 together and also for welding the A, B and C-pillar 26-30 on their upper and lower ends to the upper side beam 20 and lower side beam 22. The welding gun 62 is inserted in the access opening 64 after the B-pillar 28 is inserted in an opening 66 in one of the side beams 20, 22. A welding flange 68 is provided between the access opening 64 and the end of the B-pillar 28. The welding flange 68 is welded to an inner wall 70 of one of the beams 20, 22 by the resistance welding gun 62. The B-pillar 28 is received in an opening 66 in the middle portion of the rocker beam portion 50. As shown in FIG. 1, the opening is a mid-rocker opening 72.

Referring to FIG. 3, the connection of the upper end of the B-pillar 28 to the roof rail portion 40 of the upper side beam 20 is illustrated. The B-pillar 28 has an access hole 64 formed near its upper end. The upper end of the B-pillar 28 is received in a opening 66 formed in the roof rail portion 40. The roof rail portion 40 is a closed box shaped tubular member that has a lower wall cutout to form the opening 66.

Referring to FIG. 1, the C-pillar 30 has a reduced cross-section portion 76 on its lower end and on its upper end. The reduced cross-section portion 76 on the upper end of the C-pillar 30 is received in the opening 54 located at an upper rear terminal end of the upper side beam 20. Another reduced cross-section portion 76 is provided at the lower end of the C-pillar 30 that is received in the opening 56 at the lower rear terminal end of the lower side beam 22. Alternatively, the lower end of the C-pillar could be formed and secured like the lower end of the B-pillar.

The frame subassembly 10 is manufactured according to the following steps which may be reordered depending upon manufacturing efficiency requirements. The order of the steps should not be construed strictly but are provided merely for illustrative purposes. The upper side beam 20 and lower side beam 22 are formed in a hydro-forming operation in which tubular preforms for the beams 20, 22 are placed in a hydro-forming die, filled with water and subject to a high voltage discharge that causes a wall of the tubular preform to be formed into the desired shape of the side beam 20, 22. After the upper and lower side beams 20, 22 are formed, they are assembled together and welded at the front end 12 and along the engine compartment area 14. The fender reinforcement portions 34, 48 are welded together using the access holes 46 of the respective portions that provide access for welding guns. The lower A-pillar 52 is assembled to the upper and lower side beams 20, 22 that are then welded together with welding guns that are inserted through the access openings 64 at the upper and lower ends of the lower A-pillar 52. The B-pillar 28 is assembled to the upper and lower side beams 20, 22 and is welded together through the access opening 64 located at the upper and lower ends of the B-pillar 28. The C-pillar 30 is assembled to the upper and lower side beams 20, 22 by inserting the reduced cross-section portion 76 located at the upper and lower ends of the C-pillar 30 that are received in the openings 54 and 56 formed in the upper and lower side beams 20, 22, respectively. The upper and lower ends of the C-pillar 30 may be welded to the upper and lower side beams 20, 22 with access being provided for weld guns through the access openings 64.

While the best mode has been described in detail, those familiar with the art will recognize various alternative designs and embodiments as defined by the following claims.

What is claimed:

1. A frame subassembly for a vehicle having a front end that partially defines an engine compartment and a passenger compartment including a windshield that is located rearward of the front end, the frame subassembly comprising:
   a one-piece hydro-formed beam having an upper fender reinforcement portion disposed at the front end, an upper A-pillar portion disposed adjacent the wind shield, and a roof rail portion that spans the length of the passenger compartment;
   wherein the front structural components are attached to the upper fender reinforcement portion, the windshield is attached to the upper A-pillar portion, and the roof of the vehicle is attached to the roof rail portion.

2. The frame subassembly of claim 1 wherein the vehicle has an A-pillar, a B-pillar and a C-pillar, wherein the A-pillar is partially formed by the upper A-pillar portion of the beam and a lower A-pillar beam that is welded to the upper A-pillar portion, the B-pillar is secured to an intermediate point on the roof rail portion between a front door and a rear door of the vehicle, and the C-pillar is secured to a rear end of the roof rail portion.

3. The frame subassembly of claim 2 wherein the B-pillar has an access opening adjacent an upper end, and the beam has an intermediate opening in a lower face of the beam, the B-pillar being assembled to the beam with an upper end of the B-pillar being inserted into the intermediate opening, wherein the B-pillar has a welding flange disposed between the access opening and the upper end of the B-pillar that is welded to an inner surface of the roof rail portion of the beam.

4. The frame subassembly of claim 2 wherein the C-pillar has a reduced cross-section portion at an upper end of the C-pillar and the beam has an open end in which the C-pillar is inserted, the open end of the beam is oriented to face downwardly.

5. A frame subassembly for a vehicle having a front end that partially defines an engine compartment and a passenger compartment including a windshield that is located rearward of the front end, the frame subassembly comprising:
   a one-piece hydro-formed upper side beam having a first fender reinforcement portion disposed at the front end, an upper A-pillar portion disposed adjacent the windshield, and a roof rail portion that spans the length of the passenger compartment;
   a one-piece hydro-formed lower side beam having a second fender reinforcement portion disposed at the front end, and a rocker beam portion rearward of the second fender reinforcement portion;
   a lower A-pillar attached to the upper side beam adjacent a lower edge of the windshield and to the lower side beam adjacent a forward end of the rocker beam portion;
   a B-pillar attached at an intermediate location to the roof rail portion and at an intermediate location to the rocker beam portion; and
   a C-pillar attached to a downwardly oriented opening at an upper rear terminal end of the upper side beam and an upwardly oriented opening at a lower rear terminal end of the lower side beam.

6. The frame subassembly of claim 5 wherein a front terminal end of the first fender reinforcement portion and a front terminal end of the second fender reinforcement portion are welded together.

7. The frame subassembly of claim 5 wherein a front terminal end of the first fender reinforcement portion and a front terminal end of the second fender reinforcement portion are welded together, and wherein the first fender reinforcement portion and the second fender reinforcement portion are welded together at an intermediate location beside the engine compartment between the windshield and the front terminal ends of the fender reinforcement portions.

8. The frame subassembly of claim 5 wherein the B-pillar has an access opening adjacent an upper end, and the upper side beam has an intermediate opening in a lower face, the B-pillar being assembled to the upper side beam with an upper end of the B-pillar being inserted into the intermediate opening, wherein the B-pillar has a welding flange disposed between the access opening and the upper end of the B-pillar that is welded to an inner wall of the roof rail portion of the upper side beam.

9. The frame subassembly of claim 8 wherein the B-pillar has a second access opening adjacent an lower end, and the lower side beam has a mid-rocker opening in an upper face of the lower side beam, the B-pillar being assembled to the lower side beam with a lower end of the B-pillar being inserted into the mid-rocker opening, wherein the B-pillar has a second welding flange disposed between the second access opening and the lower end of the B-pillar that is welded to an inner wall of the rocker portion of the beam.

10. The frame subassembly of claim 5 wherein the C-pillar has a reduced cross-section portion at an upper end of the C-pillar and the upper side beam has an open end in which the C-pillar is inserted, the open end of the beam is oriented to face downwardly.

11. The frame subassembly of claim 10 wherein the C-pillar has a reduced cross-section portion at a lower end of the C-pillar and the lower side beam has an open end in which the C-pillar is inserted, the open end of the lower side beam is oriented to face upwardly.

12. A method of assembling a side frame for a vehicle having a front grill and a back end comprising:
   hydro-forming an upper side rail that has a front portion to which the front grill is attached and a rear portion to which the back end is attached;
   hydro-forming an lower side rail that has a front portion to which the front grill is attached and a rear portion to which the back end is attached;
   welding the front portions of the upper and lower side rails together;
   assembling a lower A-pillar to the upper and lower side rails;
   assembling a B-pillar to the upper and lower side rails;
   assembling a C-pillar to the upper and lower side rails; and
   welding the A-pillar, B-pillar and C-pillar to the upper and lower side rails.

13. The method of claim 12 wherein the step of hydro-forming the upper side rail further comprises forming a fender reinforcement portion that is disposed adjacent an engine compartment of the vehicle, and forming a roof rail portion that is disposed adjacent a passenger compartment portion of the vehicle.

14. The method of claim 12 wherein the step of hydro-forming the lower side rail further comprises forming a fender reinforcement portion that is disposed adjacent an engine compartment of the vehicle, and forming a rocker portion that is disposed adjacent a passenger compartment portion of the vehicle.

15. The method of claim 12 wherein the step of hydro-forming the upper and lower side rails further comprises forming access holes in the side rails, wherein at least one access hole is formed in each of the side rails to facilitate welding the side rails to each other, at least one A-pillar access hole is formed in the side rails for receiving the A-pillar, and at least one B-pillar access hole is formed in the side rails for receiving the B-pillar.

16. The method of claim 12 wherein the step of hydro-forming the upper and lower side rails further comprises forming a rear end of the upper side rail to extend in a downward direction, and forming a rear end of the lower side rail to extend in an upward direction, and wherein the upper and lower ends of the C-pillar are necked down to be assembled inside the rear ends of the upper and lower side rails, respectively.

* * * * *